US012716431B2

(12) United States Patent
Ponnusamy et al.

(10) Patent No.: US 12,716,431 B2
(45) Date of Patent: Aug. 25, 2026

(54) HYDRAULIC CYLINDER CUSHION STEM WITH OVER MOLDED SLEEVE

(71) Applicant: CATERPILLAR INC., Peoria, IL (US)

(72) Inventors: Ananda Sudhakar Ponnusamy, Naperville, IL (US); Rameshkrishnan Lakshmi Narayanan, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/780,697

(22) Filed: Jul. 23, 2024

(65) Prior Publication Data

US 2026/0029002 A1 Jan. 29, 2026

(51) Int. Cl.
*F15B 15/22* (2006.01)

(52) U.S. Cl.
CPC ............ *F15B 15/22* (2013.01); *F15B 15/222* (2013.01); *F15B 15/223* (2013.01)

(58) Field of Classification Search
CPC ....... F15B 15/22; F15B 15/222; F15B 15/223
See application file for complete search history.

(56) References Cited

U.S. PATENT DOCUMENTS 2,719,510 A * 10/1955 Elder .................... F15B 15/223 91/394
2,935,047 A 5/1960 Ortman et al.
3,247,767 A * 4/1966 Ortman ................... F16K 47/16 251/215
3,267,815 A * 8/1966 Ortman ................. F15B 15/223 92/85 B
3,324,892 A 6/1967 Aslan
3,440,930 A * 4/1969 Olson .................. F15B 15/223 277/552
3,559,535 A * 2/1971 Conolly ................ F15B 15/222 91/396
3,704,650 A * 12/1972 Berg ..................... F15B 15/222 91/395

(Continued)

FOREIGN PATENT DOCUMENTS

DE 8809693 * 9/1988 ............ F15B 15/223
DE 8809693 U1 9/1988

(Continued)

OTHER PUBLICATIONS

Written Opinion and International Search Report for Int'l. Patent Appln. No. PCT/US2025/036235, mailed Oct. 16, 2025 (19 pgs).

*Primary Examiner* — Dustin T Nguyen

(57) ABSTRACT

A hydraulic cylinder may have a tube extending from a tube first end to a tube second end, and a piston in the tube. The hydraulic cylinder may also have a piston rod attached to the piston and a cushion stem extending from the piston. The hydraulic cylinder may have a head end cavity disposed adjacent to the tube first end. The hydraulic cylinder may have a cushion sleeve disposed on the cushion stem. The cushion sleeve may be received in the head end cavity. The cushion sleeve may have an inner sleeve including an opening that receives the cushion stem. Further, the cushion sleeve may have a circumferential projection extending from an outer surface of the inner sleeve. The cushion sleeve may also have an outer sleeve surrounding the inner sleeve. An inner surface of the outer sleeve may have a circumferential recess that receives the circumferential projection.

18 Claims, 6 Drawing Sheets

(56) References Cited

U.S. PATENT DOCUMENTS

| | | | | | |
|---|---|---|---|---|---|
| 3,964,370 | A * | 6/1976 | Rich | F15B 15/222 | 91/395 |
| 4,064,788 | A * | 12/1977 | Rich | F15B 15/222 | 91/395 |
| 4,142,446 | A * | 3/1979 | Ides | F15B 15/223 | 91/395 |
| 4,352,318 | A * | 10/1982 | Kolchinsky | F15B 15/222 | 91/395 |
| 4,424,737 | A * | 1/1984 | Endo | F16F 9/49 | 285/276 |
| 4,651,623 | A * | 3/1987 | Rogers | F15B 15/223 | 92/85 B |
| 4,862,786 | A | 9/1989 | Boyer et al. | | |
| 5,623,861 | A | 4/1997 | Ward et al. | | |
| 5,720,368 | A | 2/1998 | Richardson | | |
| 7,337,885 | B2 | 3/2008 | Stow | | |
| 11,767,835 | B2 | 9/2023 | Weh et al. | | |
| 2003/0140781 | A1* | 7/2003 | Weiss | F15B 15/223 | 92/85 B |
| 2022/0228640 | A1 | 7/2022 | Bohner et al. | | |

FOREIGN PATENT DOCUMENTS

| | | | | |
|---|---|---|---|---|
| DE | 29903938 | * | 5/1999 | F15B 15/223 |
| DE | 19732761 | C2 | 11/2002 | |
| GB | 2605451 | A | 10/2022 | |
| JP | S57102706 | U | 6/1982 | |

* cited by examiner

HYDRAULIC CYLINDER CUSHION STEM WITH OVER MOLDED SLEEVE

TECHNICAL FIELD

The present disclosure relates generally to a hydraulic cylinder cushion stem and, more particularly, to a hydraulic cylinder cushion stem having an over molded sleeve.

BACKGROUND

Machines such as dozers, loaders, excavators, motor graders, and/or other types of machinery use one or more hydraulic cylinders to accomplish a variety of tasks. The hydraulic cylinders may encounter a variety of problems if a piston within a hydraulic cylinder impacts an end wall or end structure of the cylinder. For example, such impacts can limit or disturb work operations, generate undesirable noise and/or vibration, and can cause damage to the piston, cylinder, or other machine components. To prevent such problems, a snubbing device is often used to cushion the end of a piston stroke within the cylinder.

Snubbing devices at the head end of the hydraulic cylinder may include a cushion stem protruding from the piston. The cushion stem may enter a cushion stem cavity formed within the end wall or end structure of the cylinder that includes a port to allow fluid at the head end of the hydraulic cylinder to be discharged. For example, as the piston moves toward the end of the cylinder, the cushion stem enters the cushion stem cavity. As the cushion stem enters the cushion stem cavity, the cushion stem may progressively block the cushion stem cavity and/or the fluid port, thereby limiting discharge of the fluid via the fluid port. This in turn slows the movement of the piston, cushioning the end of the piston stroke. However, repeated engagement of the cushion stem with the cushion stem cavity may cause wear. Furthermore, the debris generated due to the wear may damage the cushion stem and cushion stem cavity, which in turn may decrease the effectiveness of the cushioning.

U.S. Patent Publication No. 2022/0228640 A1 of Bohner et al., published on Jul. 21, 2022 ("the '640 application"), and discloses stroke cushioning in piston and cylinder devices. The hydraulic cylinder of the '640 application includes a piston having a rod spud that is received within a spud receiver. A base end cushion sleeve is immovably seated within the spud receiver of the '640 application. As the piston approaches the head end, the rod spud enters the base end cushion sleeve forming an annular orifice between the rod spud and the cushion sleeve. The '640 publication discloses that the cross-sectional area of the annular orifice continually decreases as the rod spud advances into the spud receiver, restricting fluid flow and slowing the movement of the piston. The '640 publication also discloses that the material of the base end cushion sleeve is softer than the rod spud, making the base end cushion sleeve deformable and allowing for alignment of the rod spud in the base end cushion sleeve.

Although the '640 publication discloses that deformation of the base end cushion sleeve allows for alignment of the rod spud and the base end cushion sleeve, the rod spud of the '640 publication may still be subject to wear. Moreover, any debris generated by the interaction of the rod spud and the base end cushion sleeve may still damage the rod spud and based end cushion sleeve, decreasing the effectiveness of the cushioning.

The cushion stem with the over molded sleeve of the present disclosure solves one or more of the problems set forth above and/or other problems of the prior art.

SUMMARY

In one aspect, the present disclosure is directed to a cushion sleeve for a hydraulic cylinder. The cushion sleeve may include an inner sleeve having an opening configured to receive a cushion stem extending from a piston of the hydraulic cylinder. The cushion sleeve may also include a circumferential projection extending from an outer surface of the inner sleeve. Further, the cushion sleeve may include an outer sleeve at least partially surrounding the inner sleeve. An inner surface of the outer sleeve may include a circumferential recess configured to receive the circumferential projection.

In another aspect, the present disclosure is directed to a cushion sleeve for a hydraulic cylinder. The cushion sleeve may include a metallic inner sleeve including a threaded opening configured to threadingly receive a cushion stem extending from a piston of the hydraulic cylinder. The cushion sleeve may also include a non-metallic outer sleeve bonded to the inner sleeve. The non-metallic outer sleeve may have a non-uniform diameter.

In yet another aspect, the present disclosure is directed to a hydraulic cylinder. The hydraulic cylinder may include a tube extending from a tube first end to a tube second end. The hydraulic cylinder may also include a piston disposed in the tube. Further, the hydraulic cylinder may include a piston rod attached to the piston and configured for axial movement in the tube. The hydraulic cylinder may include a cushion stem extending from the piston. The hydraulic cylinder may also include a head end cavity disposed adjacent to the tube first end. The hydraulic cylinder may include a cushion sleeve disposed on the cushion stem and configured to be received in the head end cavity. The cushion sleeve may include an inner sleeve including an opening configured to receive the cushion stem. Further, the cushion sleeve may include a circumferential projection extending from an outer surface of the inner sleeve. The cushion seal may also include an outer sleeve at least partially surrounding the inner sleeve. An inner surface of the outer sleeve may include a circumferential recess configured to receive the circumferential projection.

DETAILED DESCRIPTION

Figure 1:
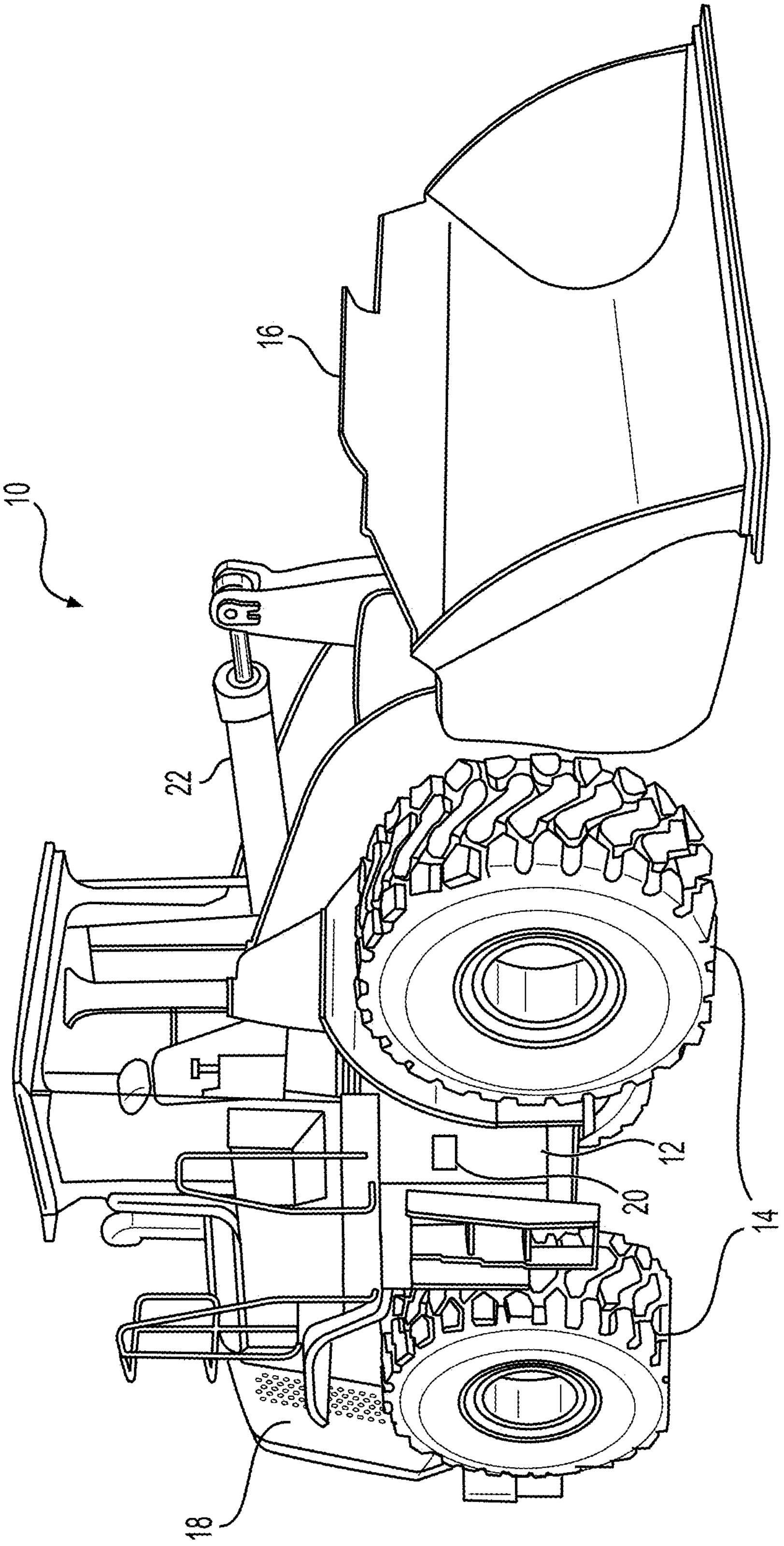
FIG. 1 is a diagrammatic illustration of an exemplary disclosed machine.

FIG. 1 illustrates an exemplary machine 10. In the depicted embodiment, the machine 10 is a wheel loader. However, machine 10 may embody another type of mobile machine such as an excavator, a shovel, a continuous miner, a loader, a truck, a track-type-tractor, a motor grader, an articulated haul truck, an off-highway mining truck, or another construction or non-construction machine known in the art. Machine 10 may include chassis 12, one or more traction devices 14 that support chassis 12 on a ground surface, at least one working implement 16, and engine 18. In one exemplary embodiment as illustrated in FIG. 1, traction devices 14 may take the form of wheels, although other types of traction devices such as crawler tracks are also contemplated.

Engine 18 may be any suitable type of internal combustion engine, such as a gasoline, diesel, natural gas, or hybrid-powered engine. In some exemplary embodiments, engine 18 may be driven by electrical power. Engine 18 may be configured to propel the one or more traction devices 14 via transmission 20. Engine 18 may also be configured to deliver power to operate one or more other components or accessory devices (e.g. pumps, fans, motors, generators, belt drives) associated with machine 10. For example, engine 18 may be configured to drive one or more pumps that may be configured to deliver hydraulic fluid to hydraulic cylinder 22, which may be configured to move working implement 16. Although only one hydraulic cylinder 22 is illustrated in FIG. 1, machine 10 may include any number of hydraulic cylinders 22.

Figure 2:
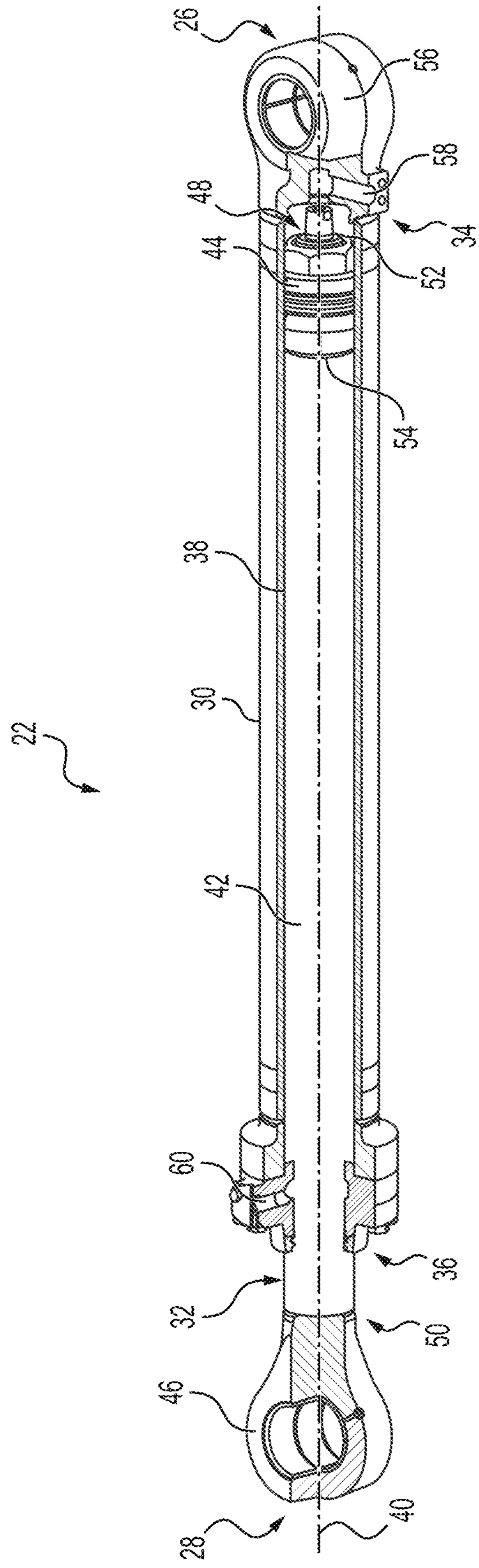
FIG. 2 is a partial cross-sectional view of an exemplary disclosed hydraulic cylinder that may be used with the machine of FIG. 1.

FIG. 2 illustrates a partial cross-sectional view of an exemplary disclosed hydraulic cylinder (e.g., hydraulic cylinder 22) that may be used with machine 10. As illustrated in FIG. 2, hydraulic cylinder 22 may extend from head end 26 to rod end 28. Hydraulic cylinder 22 may include tube 30 and piston assembly 32 slidably disposed within tube 30. Tube 30 may extend from tube first end 34 of hydraulic cylinder 22 to tube second end 36. Tube 30 may include a generally cylindrical cavity 38. In some embodiments, cavity 38 of tube 30 may have a different internal shape. For example, cavity 38 may have a square cross-section, a rectangular cross-section, a triangular cross-section, or any other shape. Cavity 38 may have a longitudinal axis 40 extending through a length of cavity 38. As used in this disclosure, the terms generally or approximately should be interpreted as encompassing commonly understood design or manufacturing tolerances.

As illustrated in FIG. 2, piston assembly 32 may include piston rod 42, piston 44, and eye member 46. Piston rod 42 may extend from piston rod first end 48 to piston rod second end 50. Eye member 46 may protrude from piston rod 42 in a direction from piston rod second end 50 towards rod end 28. Eye member 46 may be fixedly or removably attached to piston rod 42. In one exemplary embodiment, piston rod 42 and eye member 46 may form a unitary structure that may be fabricated via, for example, forging or casting. Piston rod 42 may be disposed within cavity 38 of tube 30. Piston 44 may be attached to piston rod 42 at piston rod first end 48 and may include first hydraulic surface 52 and a second hydraulic surface 54 opposite first hydraulic surface 52. An imbalance of force caused by fluid pressure on first and second hydraulic surfaces 52 and 54 may cause piston rod 42 and piston 44 to slidingly move within tube 30 along longitudinal axis 40. For example, when a force resulting from fluid pressure acting on first hydraulic surface 52 is greater than a force resulting from fluid pressure acting on second hydraulic surface 54, piston rod 42 and piston 44 may be configured to move in a direction from head end 26 towards rod end 28, increasing a length of hydraulic cylinder 22. Similarly, when a force on second hydraulic surface 54 is greater than a force on first hydraulic surface 52, piston rod 42 and piston 44 may be configured to move in a direction from rod end 28 towards head end 26, retracting piston rod 42 within tube 30, and reducing a length of hydraulic cylinder 22.

Tube first end 34 of hydraulic cylinder 22 may be equipped with eye member 56 that may protrude from tube first end 34 towards head end 26. Eye member 56 may be fixedly or removably attached to tube first end 34 of tube 30. For example, eye member 56 may include male threads that may be configured to engage with corresponding female threads in tube 30 adjacent to tube first end 34. One of eye members 46 and 56 may be pivotally connected to chassis 12, while the other of eye members 46 and 56 may be pivotally connected to work implement 16 or vice-versa. Hydraulic cylinder 22 may be supplied with a pressurized hydraulic fluid via port 58 to cause piston assembly 32 and piston 44 to displace within tube 30 to expand hydraulic cylinder 22. As piston 44 moves in a direction from head end 26 towards rod end 28, hydraulic fluid may exit hydraulic cylinder 22 via port 60. Similarly, when hydraulic cylinder 22 is supplied with pressurized hydraulic fluid via port 60, the pressurized hydraulic fluid may cause piston assembly 32 and piston 44 to displace within tube 30 to retract hydraulic cylinder 22. As piston 44 moves in a direction from rod end 28 towards head end 26, hydraulic fluid may exit hydraulic cylinder via port 58. Expansion and retraction of hydraulic cylinder 22 may function to assist in moving work implement 16 (referring to FIG. 1). Although hydraulic cylinder 22 has been described as being connected between chassis 12 and work implement 16, eye member 46 and/or eye member 56 may be connected to other structures or components of machine 10 to cause relative movement of the other structures or components by expansion and contraction of hydraulic cylinder 22.

Figure 3:
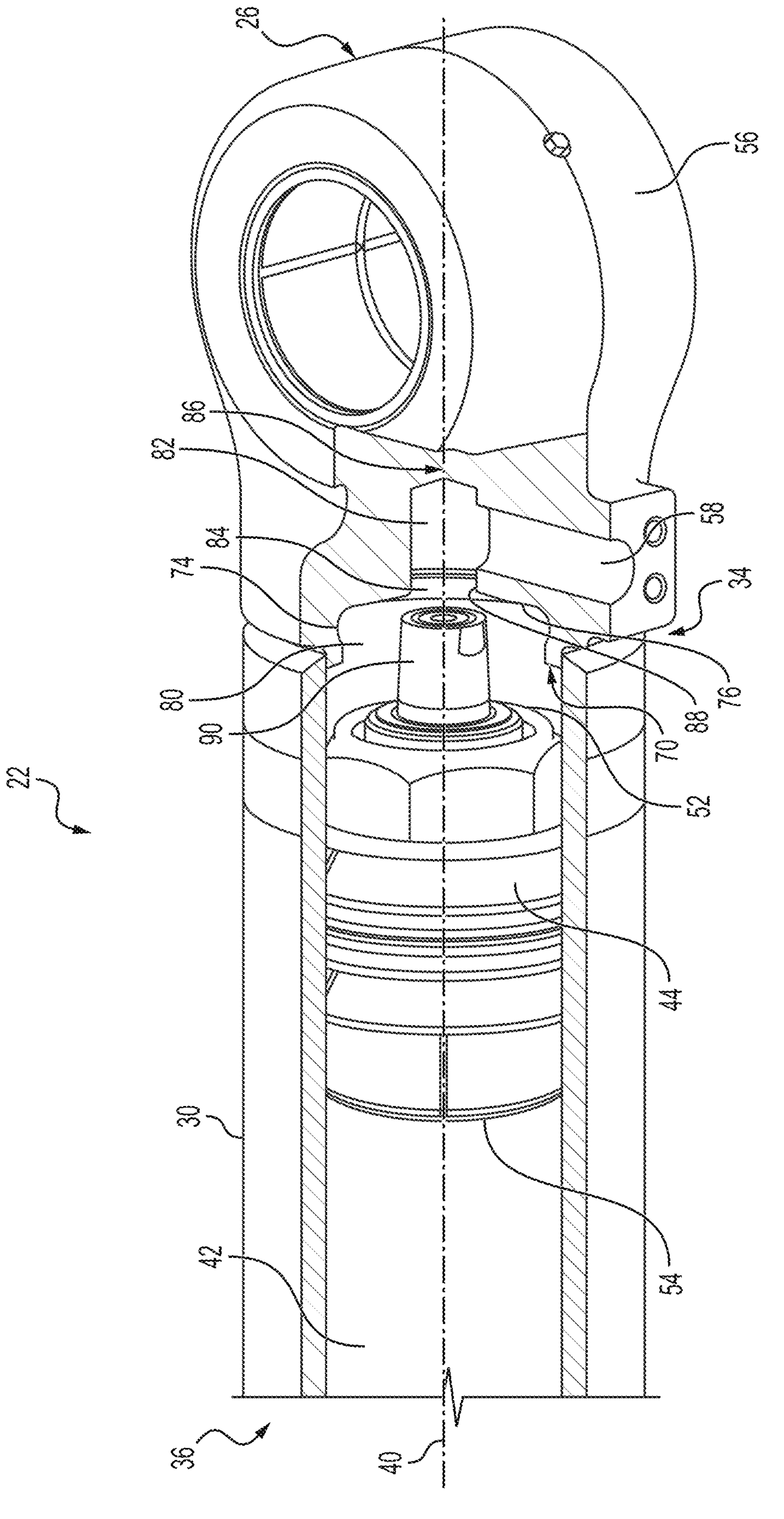
FIG. 3 is a magnified partial cross-sectional view of a head end of the hydraulic cylinder of FIG. 2.

FIG. 3 illustrates an enlarged partial cross-sectional view of hydraulic cylinder 22 adjacent to head end 26 and eye member 56. Eye member 56 may extend from eye member first end 70 to head end 26. Eye member first end 70 may be disposed adjacent to tube first end 34. In one exemplary embodiment as illustrated in FIG. 3, eye member 56 may include cavity 74 extending into eye member 56, from eye member first end 70 to cavity base 76 disposed between eye member first end 70 and head end 26. Cavity 74 together with a portion of tube 30 adjacent to tube first end 34 may define head end cavity 80.

Cushion stem cavity 82 may extend from cavity base 76 at cushion groove 84 to cushion stem cavity end 86 disposed between cavity base 76 and head end 26. Port 58 may be located between cavity base 76 and cushion stem cavity end 86 and may be fluidly connected to cushion stem cavity 82. Cushion groove 84 may have inner surface 88 that may define a portion of cushion stem cavity 82 disposed between cavity 74 and port 58. Cushion stem cavity 82 and cushion groove 84 may each have a diameter smaller than that of cavity 74. Thus, hydraulic fluid may flow via port 58 into or out of cavity 74, head end cavity 80, and cushion stem cavity 82. Although, port 58, cavity 74, and cushion stem cavity 82 have been illustrated and described as being located in eye member 56, in some exemplary embodiments, tube 30 may be closed via a cap at tube first end 34 and one or more of port 58, cavity 74, and cushion stem cavity 82 may be disposed in the cap.

Figure 4:
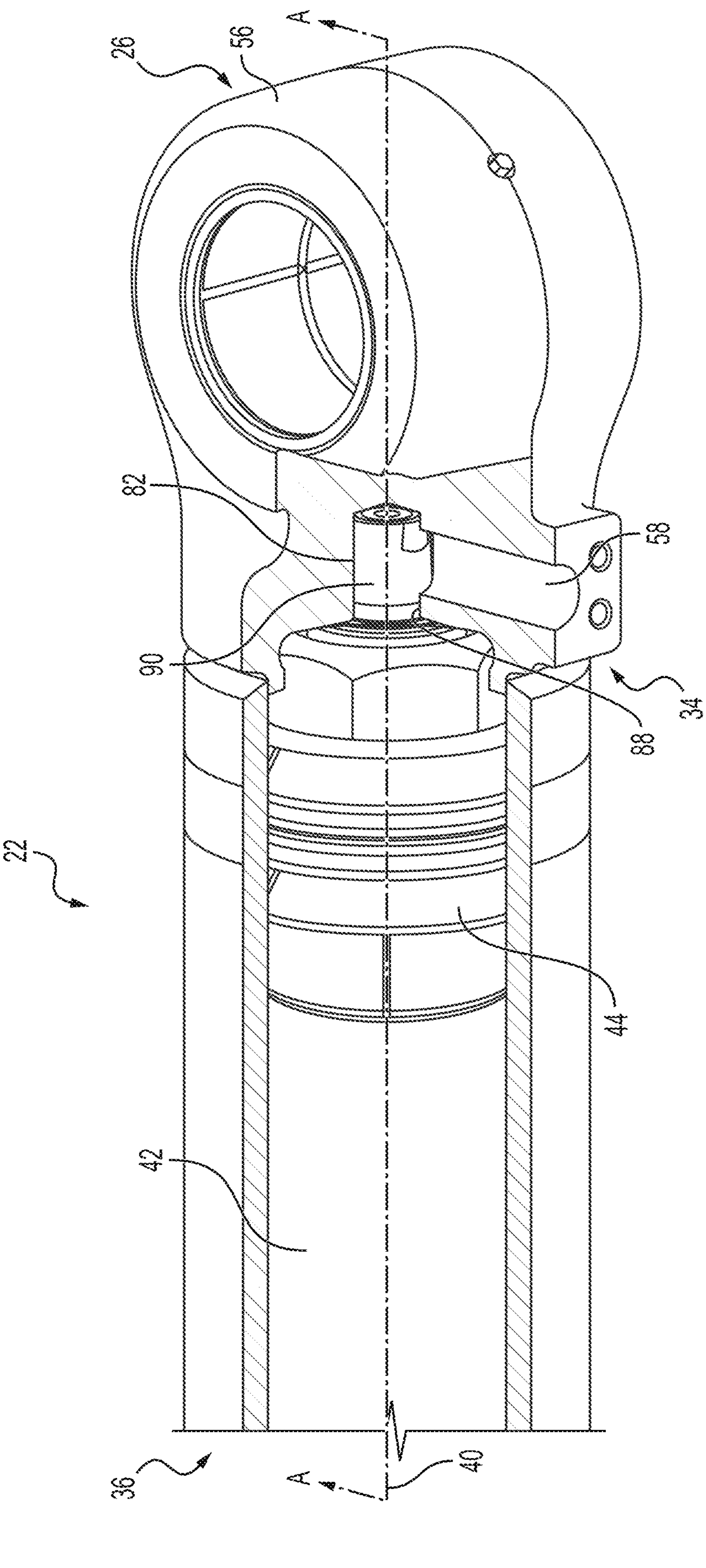
FIG. 4 is another magnified partial cross-sectional view of a head end of the hydraulic cylinder of FIG. 2.

As also illustrated in FIG. 3, piston assembly 32 may include cushion sleeve 90 protruding from first hydraulic surface 52 of piston 44 towards tube first end 34 and head end 26. Cushion sleeve 90 may have an outer diameter that may be smaller than an inner diameter of cushion stem cavity 82 such that cushion sleeve 90 is receivable in cushion stem cavity 82. FIG. 4 illustrates another enlarged partial cross-sectional view of hydraulic cylinder 22 adjacent to head end 26 showing cushion sleeve 90 positioned within cushion stem cavity 82. In this configuration, cushion sleeve 90 has entered into cushion stem cavity 82 via cushion groove 84 and may partially or completely block flow of hydraulic fluid through port 58, which may increase the pressure at tube first end 34 of tube 30 at the end of a stroke, which in turn may slow movement of piston 44 towards head end 26 thereby cushioning such movement until eventually preventing further movement of piston 44 towards head end 26.

Figure 5:
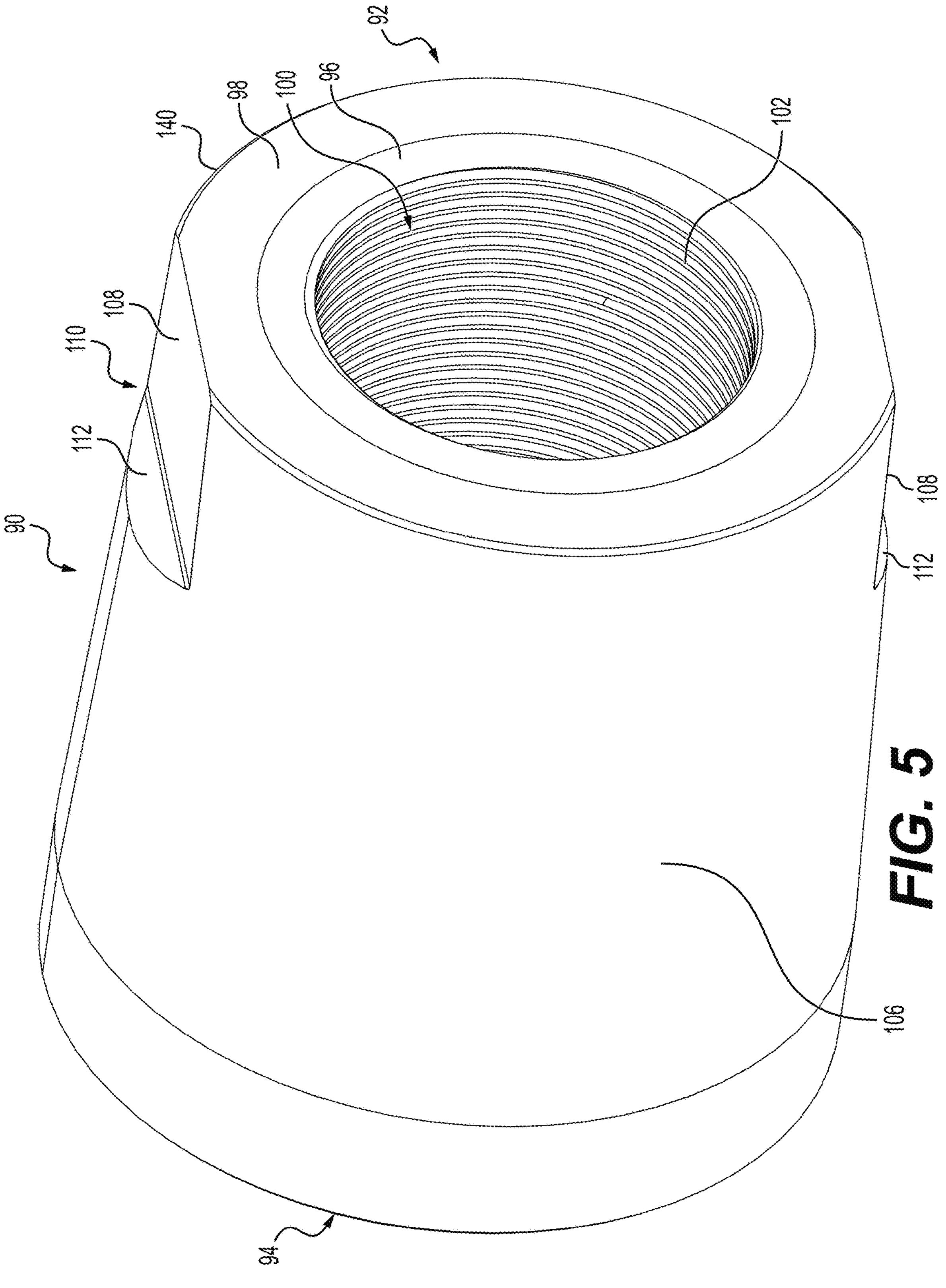
FIG. 5 is a perspective view of a cushion seal for the hydraulic cylinder of FIG. 2.

FIG. 5 illustrates a perspective view of an exemplary embodiment of cushion sleeve 90. As illustrated in FIG. 5, cushion sleeve 90 may extend from first end 92 to second end 94. Second end 94 may coincide with or may be disposed adjacent to first hydraulic surface 52 (see FIGS. 2 and 6) of piston 44. First end 92 may be positioned at larger distance from first hydraulic surface 52 of piston 44 as compared to second end 94. Cushion sleeve 90 may include inner sleeve 96 and outer sleeve 98, each of which may extend axially from adjacent first end 92 to adjacent second end 94. In one exemplary embodiment as illustrated in FIG. 5, inner sleeve 96 and outer sleeve 98 may have approximately equal lengths. In other exemplary embodiments, inner sleeve 96 and outer sleeve 98 may have different lengths with inner sleeve 96 extending beyond outer sleeve 98 one or both of first end 92 or second end 94, or vice versa.

Inner sleeve 96 may have a generally annular shape with an opening 100 extending through a length of inner sleeve 96 from adjacent first end 92 to adjacent second end 94. In one exemplary embodiment, inner sleeve 96 may be cylindrical. In other embodiments, inner sleeve 96 may have a non-circular cross-section. Opening 100 may include a threaded inner surface 102 that may include one or more female threads 104 (see FIG. 6). In one exemplary embodiment, inner surface 102 may be generally cylindrical. In other embodiments, inner surface 102 may have a different shape, for example, a conical shape. As further illustrated in FIG. 5, outer sleeve 98 may surround inner sleeve 96. In some embodiments, outer sleeve 98 may partially surround inner sleeve 96. Outer sleeve 98 may have an annular configuration such that inner sleeve 96 may be received within outer sleeve 98. Outer sleeve 98 may have outer surface 106 and one or more of flat surfaces 108. As illustrated, outer sleeve 98 includes a pair of flat surfaces 108 disposed diametrically opposite to each other. As will be explained with reference to FIG. 6, flat surface 108 may allow for a tool (e.g., spanner or wrench) that may engage with flat surface 108 for rotation of cushion sleeve 90 during assembly of cushion sleeve 90 with piston 44. In one exemplary embodiment as illustrated in FIG. 5, each flat surface 108 may extend from adjacent first end 92 to flat surface end 110 disposed between first end 92 and second end 94. As also illustrated in FIG. 5, angled surface 112 may extend between and may connect flat surface 108 with outer surface 106 of outer sleeve 98. Inner sleeve 96 and outer sleeve 98 may be made of the same or different materials. For example, in some embodiments, inner sleeve 96 may be made of metal whereas outer sleeve 98 may be made of metal, plastic, rubber, or elastomeric material.

Figure 6:
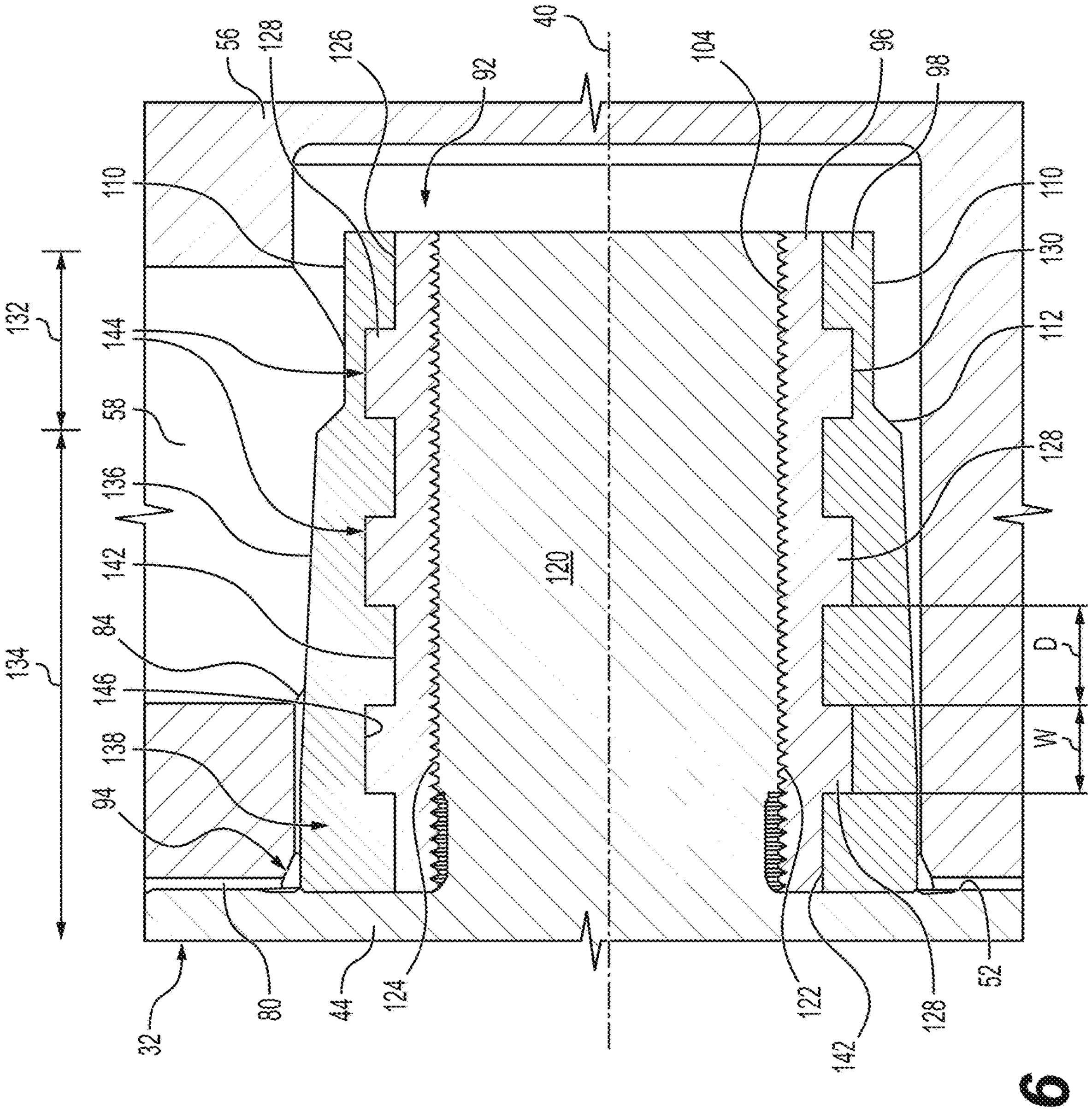
FIG. 6 is magnified vertical cross-section of the cushion seal of FIG. 5 taken along line A-A of FIG. 4.

FIG. 6 is an enlarged vertical cross-section taken along line A-A of FIG. 4. In the configuration illustrated in FIG. 6, cushion sleeve 90 is disposed within cushion stem cavity 82 (see FIG. 4) and may also block some or all of port 58. As also illustrated in FIG. 6, piston 44 may include cushion stem 120 that may protrude from first hydraulic surface 52 of piston 44. For example, cushion stem 120 may extend from first hydraulic surface 52 of piston 44 in a direction away from rod end 28 (see FIG. 2) and towards head end 26 or tube first end 34 (see FIGS. 2-4). In one exemplary embodiment, cushion stem 120 may be generally cylindrical and may have a threaded outer surface 122 having male threads 124. In some exemplary embodiments, cushion stem 120 may have a conical outer surface 122. A shape of outer surface 122 of cushion stem 120 may correspond to a shape of inner surface 102 (see FIG. 5) of opening 100 in inner sleeve 96. Male thread 124 of cushion stem 120 may be configured to engage with corresponding female thread 104 (see FIG. 5) of inner sleeve 96 to allow threaded attachment of outer sleeve 98 to cushion stem 120. Although inner sleeve 96 and cushion stem 120 have been illustrated and described as having threads, in some exemplary embodiments, inner surface 102 of inner sleeve 96 and outer surface 122 of cushion stem 120 may not include threads but may be assembled via a press fit or via a sliding fit arrangement. When a sliding fit arrangement is used, a locking pin (not shown) may be used to prevent disassembly of inner sleeve 96 from cushion stem 120. In some exemplary embodiments, piston 44 may not include cushion stem 120, but instead may include female threads, and instead of opening 100, inner sleeve 96 may include a threaded stub extension with male threads configured to engage with female threads in piston 44.

As also illustrated in FIG. 6, outer surface 126 of inner sleeve 96 may be generally cylindrical, although other shapes such as elliptical, square, polygonal, or any other known shapes may also be used. One or more projections 128 may extend radially outward from outer surface 126 of inner sleeve 96. In one exemplary embodiment, one or more projections 128 may be circumferential and adjacent projections 128 may be axially spaced apart along longitudinal axis 40. That is, projections 128 may extend along a circumference or periphery of the entirety of outer surface 126. Although only three projections 128 have been illustrated in FIG. 6, inner sleeve 96 may include any number of projections 128.

In other exemplary embodiments, inner sleeve 96 may include a plurality of radial projections 128 spaced apart from each other axially as well as along a circumference of outer surface 126. For example, in some embodiments, several sets of radial projections 128 may be axially spaced apart (e.g., along axis 40) from each other with each of the sets including radial projections 128 disposed circumferentially spaced apart from each other.

An axial width "W" (e.g., along longitudinal axis 40) of projections 128 may be equal or unequal. Similarly, an axial spacing "D" between adjacent projections 128 may be equal or unequal. Further, although projections 128 have been illustrated in FIG. 6 as being spaced apart from both first end 92 and second end 94, one or more projections 128 may be located flush with one or both of first end 92 and second end 94. Outer surface 130 of each projection 128 may be disposed generally parallel to longitudinal axis 40, forming a generally cylindrical outer surface. In some exemplary embodiments, outer surface 130 of one or more projections 128 may be inclined relative to longitudinal axis 40 and angles of inclination of outer surface 130 relative to longitudinal axis 40 for different radial projections 128 may be equal or unequal.

As further illustrated in FIG. 6, outer sleeve 98 may be an over molded cover that may surround inner sleeve 96. In some exemplary embodiments, outer sleeve 98 may be removably attached to inner sleeve 96. In other exemplary embodiments, outer sleeve 98 may be bonded to inner sleeve 96 using an adhesive or other bonding techniques so that outer sleeve 98 and inner sleeve 96 form an integral component. Outer sleeve 98 may include nose portion 132 and body portion 134. Nose portion 132 may form a first portion of outer sleeve 98 and may extend from first end 92 towards second end 94. Body portion 134 may include leading end portion 136 (or second portion) extending from nose portion 132 toward second end 94. Body portion 134 may also include trailing end portion 138 (or third portion) that may extend from leading end portion 136 to second end 94. Nose portion 132 may have an outer surface 140 (see also FIG. 5). In some embodiments, one or more of an outer diameter of nose portion 132, leading end portion 136, and trailing end portion 138 may be uniform. In other embodiments, one or more of the outer diameter of nose portion 132, leading end portion 136, and trailing end portion 138 may increase in a direction from first end 92 to second end 94. In some exemplary embodiments, a maximum diameter of outer surface 140 of nose portion 132 may be smaller than a maximum diameter of leading end portion 136, which in turn may be smaller than a maximum diameter of trailing end portion 138. Outer surface of leading end portion 136 may be inclined at a first angle relative to longitudinal axis 40 or relative to a plane extending diametrically across outer sleeve 98. That is, outer surface of leading end portion 136 may be conical or have an approximate conical shape. Outer surface of trailing end portion 138 may be inclined at a second angle relative to longitudinal axis 40 or relative to the plane extending diametrically across outer sleeve 98. That is, outer surface of trailing end portion 138 may be conical or have an approximate conical shape. In some exemplary embodiments, the first angle may be greater than the second angle. As also illustrated in FIG. 6, and as discussed with reference to FIG. 5, nose portion 132 may include a pair of flat surfaces 108 disposed diametrically opposite to each other and angled surfaces 112. Angled surfaces 112 may connect flat surfaces 108 with leading end portion 136 of body portion 134.

Inner surface 142 of outer sleeve 98 may have a generally cylindrical or conical shape that may correspond to a shape of outer surface 126 of inner sleeve 96. Inner surface 142 of outer sleeve 98 may also include one or more recesses 144 configured to receive corresponding projections 128. Recesses 144 may extend from inner surface 142 of outer sleeve 98 in a radially outward direction such that recess base 146 of each recess is disposed between inner surface 142 and outer surface 106 (see also FIG. 5) of outer sleeve 98. The distribution, shape, and size of recesses 144 may be complementary to the distribution shape and size of projections 128. For example, when projections 128 are radially extending circumferential projections, recesses 144 may be radially extending circumferential recesses configured to receive the complementary projections 128. When projections 128 do not extend circumferentially but include a plurality of projections 128 spaced apart from each other around a circumference of inner sleeve 96, recesses 144 likewise may be circumferentially spaced apart from each other to receive the complementary projections 128. Outer sleeve 98 may include any number of recesses 144 sufficient to receive the corresponding number of projections 128.

INDUSTRIAL APPLICABILITY

The disclosed cushion seal may be used in one or more hydraulic cylinders in various machines, such as wheel loaders, cable shovels, drag lines, electric rope shovels, excavators, and front shovels to provide a cushioning or snubbing effect as the piston approaches the end of the hydraulic cylinder. Specifically, the disclosed cushion seal may be threadingly attached to a cushion stem of a piston in the hydraulic cylinder. Such an attachment method may make it easier for the cushion sleeve to be removed and repaired or replaced should the need arise. A brief description of the cushioning function of the disclosed cushion seal is provided below.

As discussed above, cushion stem 120 may project from piston 44. Female threads 104 on inner surface of inner sleeve 96 of cushion sleeve 90 may engage with male threads 124 on outer surface 122 of cushion stem 120 such that the cushion sleeve 90 may be screwed onto cushion stem 120. A tool such as a spanner or wrench may be used to engage with flat surfaces 108 to help turn cushion sleeve 90 as it is screwed onto cushion stem 120. Additionally or alternatively, a tool (e.g., pliers) may be used to grip outer sleeve 98 and rotate cushion sleeve 90, especially when outer sleeve 98 is made of, for example, an elastomeric material.

During operation of hydraulic cylinder 22, hydraulic fluid may be supplied to hydraulic cylinder 22 via port 60 (see FIG. 2) and hydraulic fluid may be allowed to drain from hydraulic cylinder 22 via port 58 (see FIG. 2). The differential pressure on first and second hydraulic surfaces 52 and 54 may cause piston 44 to move in a direction from tube second end 36 to tube first end 34. As piston 44 approaches tube first end 34 of tube 30, nose portion 132 of cushion sleeve 90 may approach cushion groove 84 and potentially engage cushion groove 84 of cushion stem cavity 82. The conical outer surface of nose portion 132 may help align cushion sleeve 90 with cushion groove 84 allowing nose portion 132 and cushion seal 90 to enter cushion groove 84 and thereby enter cushion stem cavity 82. When nose portion 132 enters cushion groove 84, hydraulic fluid may flow from tube 30 into cushion stem cavity 82 through an annular cross-sectional area between an outer surface 140 (see FIG. 5) of nose portion 132 and an inner surface 88 (see FIG. 3) of cushion groove 84. Because this annular cross-sectional area is much smaller than the cross-sectional area of tube 30, cavity 74, or cushion stem cavity 82, the amount and rate of hydraulic fluid flowing out of port 58 may be reduced. This in turn may increase the pressure on first hydraulic surface 52, causing a movement of piston 44 towards tube first end 34 to slow down. As cushion seal 90 continues to enter cushion stem cavity 82, the increasing outer diameter of leading end portion 136 and trailing end portion 138 may further reduce the available annular cross-sectional area, between cushion sleeve 90 and inner surface 88 of cushion groove 84, which in turn may continue to slow down the movement of piston 44 toward tube first end 34 until piston 44 comes to a stop in head end cavity 82.

By using a material for outer sleeve 98, e.g., an elastomeric material, that may be softer than the metallic material used for piston 44 or tube 30, including cushion groove 84 and cushion seat cavity 82, the interaction between outer surface 106 of outer sleeve 98 and cushion groove 84 may lead to reduced wear between cushion groove 84 and outer sleeve 98 during engagement thereof. The use of a softer material for outer sleeve 98 may also help minimize generation of debris due to the interference between outer surface 106 of outer sleeve 98 and cushion groove 84. Reduction in the amount of generated debris may further help minimize wear of cushion groove 84, cushion seal 90, and any other components of cylinder 22. Furthermore, because cushion sleeve 90 is easily removable by, e.g., unscrewing cushion sleeve 90 from cushion stem 120, the disclosed cushion sleeve 90 may help reduce an amount of labor and time required to repair or replace cushion seals 90 in one or more hydraulic cylinders 22. Thus, cushion sleeve 90 of the present disclosure may provide improved wear resistance and ease of maintenance for hydraulic cylinders 22.

It will be apparent to those skilled in the art that various modifications and variations can be made to the disclosed hydraulic cylinder and cushion seal. Other embodiments will be apparent to those skilled in the art from consideration of the specification and practice of the disclosed hydraulic cylinder and cushion seal. It is intended that the specification and examples be considered as exemplary only, with a true scope being indicated by the following claims and their equivalents.

What is claimed is:

1. A cushion sleeve for a hydraulic cylinder, comprising:
- an inner sleeve including an opening configured to receive a cushion stem extending from a piston of the hydraulic cylinder;
- a circumferential projection extending from an outer surface of the inner sleeve; and
- an outer sleeve at least partially surrounding the inner sleeve, an inner surface of the outer sleeve including a circumferential recess configured to receive the circumferential projection, the circumferential recess extending into a thickness of the outer sleeve from the inner surface of the outer sleeve;
  - the outer sleeve comprises:
    - a first portion and a second portion, the first portion extending from a first end of the outer sleeve to an intermediate position in a direction towards a second end of the outer sleeve, and
    - the second portion extending from the first portion at the intermediate position in a direction towards the second end of the outer sleeve,
    - wherein the second portion has a first outer diameter adjacent the first portion and a second outer diameter adjacent the second end, the second outer diameter being larger than the first outer diameter, and
    - wherein an outer surface of the first portion defines a pair of flat surfaces disposed generally opposite to each other, the pair of flat surfaces extending from the first end towards the second end.

2. The cushion sleeve of claim 1, further including threads in the opening configured to mate with threads on the cushion stem.

3. The cushion sleeve of claim 1, wherein the first portion has a generally uniform outer diameter.

4. The cushion sleeve of claim 1, wherein
- the inner sleeve comprises a first material, and
- the outer sleeve comprises a second material different from the first material.

5. The cushion sleeve of claim 4, wherein the first material is a metal and the second material is one of plastic, rubber, or elastomer.

6. The cushion sleeve of claim 1, wherein the outer sleeve is bonded to the inner sleeve.

7. The cushion sleeve of claim 1, wherein the outer sleeve is an over molded member.

8. A cushion sleeve for a hydraulic cylinder, comprising:
- a metallic inner sleeve including a threaded opening configured to threadingly receive a cushion stem extending from a piston of the hydraulic cylinder;
- a non-metallic over molded outer sleeve surrounding the inner sleeve, the non-metallic outer sleeve having a non-uniform outer diameter;
- a plurality of projections formed on an outer surface of the inner sleeve, and
- a plurality of recesses formed on an inner surface of the outer sleeve and configured to receive respective ones of the plurality of projections.

9. The cushion sleeve of claim 8, wherein the outer sleeve extends from a first end to a second end and the outer sleeve comprises:
- a first portion extending from the first end towards the second end; and
- a second portion extending from the first portion towards the second end; and
- a third portion extending from the second portion to the second end,
- wherein the second portion and the third portion have increasing outer diameters in a direction from the first end towards the second end.

10. The cushion sleeve of claim 9, wherein
- an outer surface of the second portion is inclined at a first angle relative to a longitudinal axis of the cushion sleeve,
- an outer surface of the third portion is inclined at a second angle relative to the longitudinal axis, and
- the first angle is greater than the second angle.

11. The cushion sleeve of claim 9, wherein the first portion has a generally uniform outer diameter.

12. The cushion sleeve of claim 9, wherein an outer surface of the first portion includes a pair of flat surfaces disposed generally opposite each other.

13. The cushion sleeve of claim 8, wherein the outer sleeve is an over molded member.

14. A hydraulic cylinder, comprising:
- a tube extending from a tube first end to a tube second end;
- a piston disposed in the tube;
- a piston rod attached to the piston and configured for axial movement in the tube;
- a cushion stem extending from the piston;
- a head end cavity disposed adjacent to the tube first end;
- a cushion sleeve disposed on the cushion stem and configured to be received in the head end cavity, the cushion sleeve comprising:
  - an inner sleeve including an opening configured to receive the cushion stem and a plurality of circumferential projections formed on and extending radially outward from an outer surface of the inner sleeve; and
  - an outer sleeve at least partially surrounding the inner sleeve and including a plurality of circumferential recesses formed on an inner surface of the outer sleeve and configured to receive respective ones of the plurality of circumferential projections, the plurality of circumferential recesses extending into a thickness of the outer sleeve from an inner surface of the outer sleeve.

15. The hydraulic cylinder of claim 14, further including a port fluidly connected to the head end cavity, wherein the cushion sleeve is configured to at least partially block fluid flow out the port when the cushion sleeve is received in the head end cavity.

16. The hydraulic cylinder of claim 14, wherein
- the cushion stem includes male threads on an outer surface of the cushion stem, the opening of the inner sleeve includes female threads, and the male threads of the cushion stem are configured to threadingly engage with the female threads in the opening of the inner sleeve.

17. The hydraulic cylinder of claim 14, wherein the inner sleeve is metallic, the outer sleeve comprises one of plastic, rubber, or elastomer material, and the outer sleeve is bonded to the inner sleeve.

18. The hydraulic cylinder of claim 14, wherein the head end cavity includes a cushion stem cavity, the outer sleeve extends from a first end to a second end, and the outer sleeve comprises:

a nose portion extending from the first end towards the second end, the nose portion having a nose outer diameter smaller than an inner diameter of the cushion stem cavity; and a body portion extending from the nose portion to the second end, the body portion including:

a leading end portion extending from the nose portion towards the second end, the leading end portion increasing in diameter from the nose outer diameter to a leading end outer diameter; and a trailing end portion extending from the leading end portion to the second end, the trailing end portion increasing in diameter from the leading end outer diameter to a trailing end outer diameter adjacent the second end.

* * * * *